United States Patent [19]

Rubenstein et al.

[11] Patent Number: 5,485,546
[45] Date of Patent: Jan. 16, 1996

[54] DISCRIMINATION AND TESTING METHODS AND APPARATUS EMPLOYING ADAPTIVELY CHANGING NETWORK BEHAVIOR BASED ON SPATIAL AND HETEROCELLULAR MODIFICATION RULES

[75] Inventors: Allen I. Rubenstein; Joseph A. Galley; P. Read Montague; George N. Reeke, all of New York, N.Y.

[73] Assignee: Neurosciences Research Foundation, Inc., San Diego, Calif.

[21] Appl. No.: 873,658

[22] Filed: Apr. 23, 1992

Related U.S. Application Data

[63] Continuation of Ser. No. 515,309, Apr. 27, 1990, abandoned.

[51] Int. Cl.[6] .............................. G06F 15/00; G06F 15/18
[52] U.S. Cl. .................................. 395/23; 395/24
[58] Field of Search ............................ 395/2, 22, 23, 395/24; 364/807

[56] References Cited

U.S. PATENT DOCUMENTS

| | | | |
|---|---|---|---|
| 4,807,168 | 2/1989 | Moopenn et al. | 364/513 |
| 4,873,455 | 10/1989 | de Chambost et al. | 395/24 |
| 4,918,620 | 4/1990 | Ulug | 395/22 |
| 4,947,482 | 8/1990 | Brown | 364/513 |
| 4,990,838 | 2/1991 | Kawato | 364/513 |
| 5,003,360 | 3/1991 | Okada et al. | 395/24 |
| 5,014,219 | 5/1991 | White | 395/11 |
| 5,050,096 | 9/1991 | Seidman | 364/513 |
| 5,105,468 | 4/1992 | Guyon et al. | 395/22 |
| 5,136,687 | 8/1992 | Edelman et al. | 395/22 |
| 5,142,665 | 8/1992 | Bigus | 395/22 |

OTHER PUBLICATIONS

Hoptroff et al, "Diffusion Learning for the Multilayer Perceptron", 1st IEEE Inter-Conf. on Artificial Neural Networks, 16–18 Oct., 1989.

Primary Examiner—George B. Davis
Attorney, Agent, or Firm—Gottlieb, Rackman & Reisman

[57] ABSTRACT

An apparatus for categorizing objects employs a neural network having a plurality of cells each having memory for storing a state variable, and a plurality of synaptic junctions connecting cells of the network and having memory for storing a synaptic strength variable. A computer is used to modify the synaptic strength variable in accordance with a heterocellular synaptic modification rule. That modification rule includes both the passage of time and the values of the state variables of each cell and of those other cells having specific spatial locations with respect to the cell in three dimensional space.

4 Claims, 5 Drawing Sheets

DISCRIMINATION AND TESTING METHODS AND APPARATUS EMPLOYING ADAPTIVELY CHANGING NETWORK BEHAVIOR BASED ON SPATIAL AND HETEROCELLULAR MODIFICATION RULES

This is a continuation of prior application Ser. No. 515,309, filed on Apr. 27, 1990 entitled Discrimination and Testing Methods and Apparatus Employing Adaptively Changing Network Behavior Based on Spatial and Heterocellular Modification Rules.

BACKGROUND OF THE INVENTION

This invention relates to the general category of devices employing "neural networks." As disclosed in U.S. Pat. No. 5,136,687, Ser. No. 419,524, filed Oct. 10, 1989, entitled "Categorization Automata Employing Neuronal Group Selection With Reentry" and assigned to the same assignee, such devices are capable of learning and of discriminating and selecting objects based upon characteristics that are not predetermined when the device is designed or constructed. The complete disclosure of that application is incorporated herein by references and generally teaches how to construct a selection and discrimination automaton or robot incorporating a neural network of a particular kind. Such networks are made up of a number of interconnected units, often called "cells;" the connections between cells are often called "synapses." This terminology is based on an analogy to biological systems. Each cell usually has several (or many) inputs from other cells in the network, and in some way it integrates these inputs to determine its (usually) single-valued output, which is then transmitted via synapses to other cells. Typically, each synapse has an associated mathematical "weight" that determines the relative influence of that particular synapse in the cellular integration. In each "cycle" of the device, these synaptic weights may be changed to alter the behavior of the overall network. There have been many such networks developed for different purposes in the past few years. While these network schemes differ in significant detail, they share the common feature that rules for changing the synaptic weights depend only on the previous or current activity of the cell and its connections, perhaps including some parameters that decay with time, and perhaps on the overall current performance level of the network, e.g., the difference between an expected output and the observed output.

In these various systems, there is no direct way for a cell to influence the behavior of those cells to which it is not connected. Useful synaptic modification rules are thus constrained. Furthermore, connections between units are usually established at the outset, and there is no mechanism for making new connections or removing old ones (other than by setting their weights to zero) as the device operates.

BRIEF DESCRIPTION OF THE INVENTION

The present invention provides discrimination and testing methods and apparatus employing a new method for adaptively changing network behavior based on explicit consideration of the surrounding space. By "discrimination" is meant the ability to characterize and sort objects based upon characteristics determined during the operation of the apparatus/process. By "testing" is meant the ability to determine from the modifications that take place within the parameter space defining the state of the neural network how a biologically similar organ, such as a portion of a brain, would respond to outside stimuli.

The present invention allows the modeling of the diffusion of substances or forces within the three dimensional space adjacent to particular cells and/or synapses according to well-established physical laws for diffusion or the action of electromagnetic fields across space. These substances or fields can be produced locally by the cells or synapses themselves, or alternatively can be added or imposed from an external source. The local concentrations of diffusible substances or strengths of imposed fields are important parameters in a new kind of "heterocellular" synaptic modification rules, allowing a cell to strongly influence the behavior of other cells regardless of whether they are directly connected by synapses. The term "heterocellular synaptic modification rule" is defined herein as a rule which modifies the strength of a synaptic junction in accordance with the passage of time and events occurring at stimulated synaptic junctions on other cells. Furthermore, the explicit consideration of surrounding space in the device allows mechanisms for making new connections between cells and for removing old ones during its operation.

The present invention has applications in many areas, including those where standard neural networks have already been used. Two such areas are the testing of the effects of diffusible drugs on biological nervous systems, and the construction of categorization automata.

It is an object of the present invention to provide artificial neural networks having heterocellular synaptic modification rules.

It is a further object of the present invention to provide automata having heterocellular synaptic modification rules.

It is a still further object of the present invention to provide such networks wherein the heterocellular rule allows the diffusion of a substance in space from unit to unit contained in that space to control synaptic changes.

It is a further object of the present invention to provide such networks wherein the heterocellular rule allows field propagation, including as examples, magnetic or optical fields, to control synaptic change.

It is a further object of the present invention to provide apparatus and methods responsive to real or simulated external or internal stimulation by diffusible substances so that such substances determine the response of components of the . neural network that model biological systems.

DETAILED DESCRIPTION OF A PREFERRED EMBODIMENT

A preferred embodiment of this invention will be described in terms of the modification of a simulator of neural networks per se. It should be understood that specific automata, robots, etc. may then be constructed in accord with the disclosure of U.S. Pat. No. 5,136,687, Ser. No. 419,524. Some aspects of this construction will be described but further details of the description are contained in that patent.

This simulator allows the user to construct complex neural networks that have both functional connectivity and explicitly modeled geometrical relationships among the units. This is accomplished by combining the simulation of a neural network possessing preestablished connectivity with the simulation of three dimensional space such that the units and their connections have specific spatial locations. The units and their connections can influence the surrounding space through the release of substances into this space. Conversely, substances introduced into the space can affect the properties of the units and their connections. Similar effects can be obtained through the action of locally generated or propagated electromagnetic fields. The linkage through the simulated three dimensional space allows for a new mode of communication among the units in a neural network.

An additional property is the ability to simulate changing network connectivity in an active network. The changing connectivity can be made contingent upon both unit activity and substance(s) concentration in the surrounding space.

Figure 1:
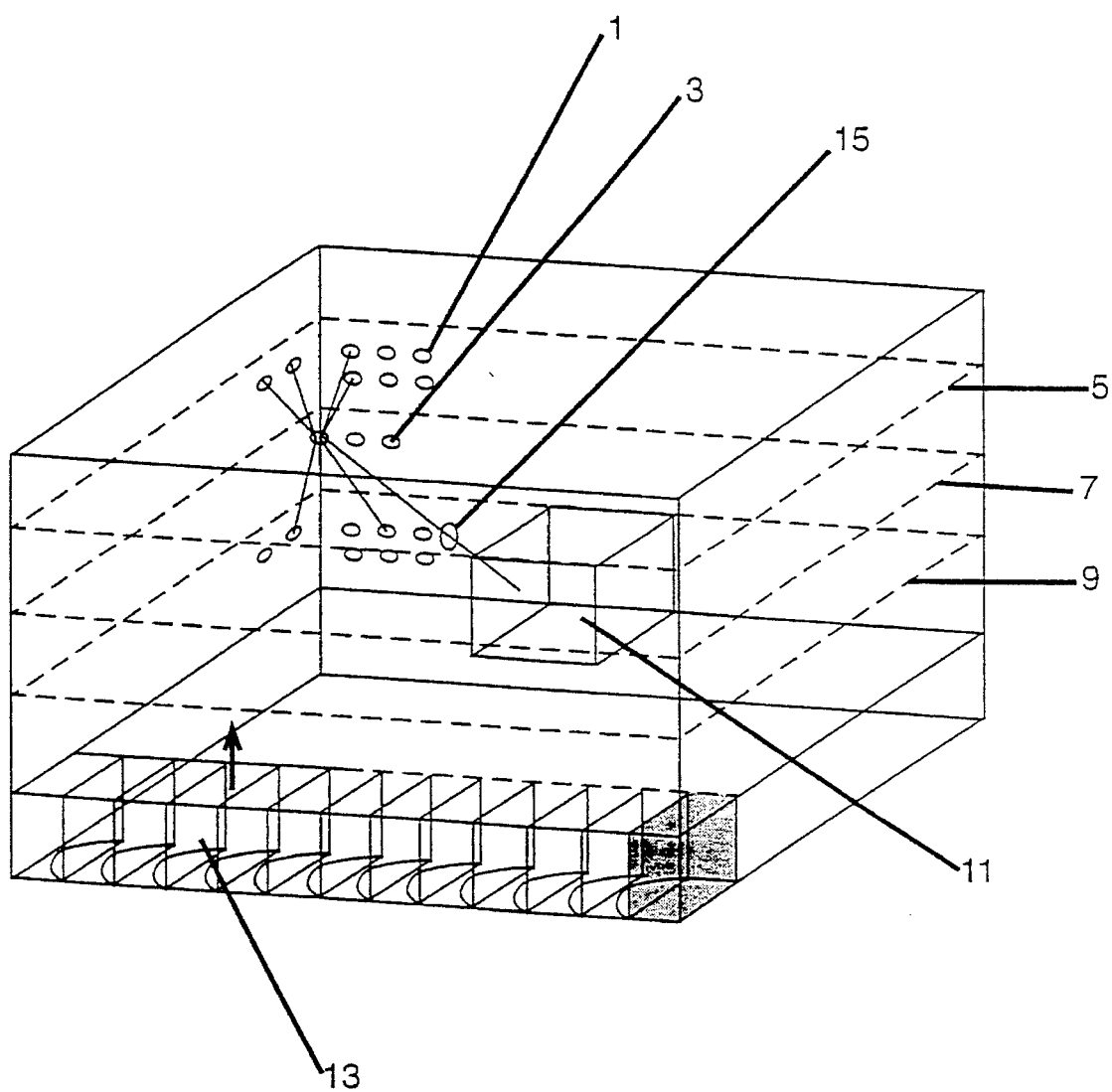
FIG. 1 is a diagram illustrating three-dimensional space divided into diffusion compartments and how these compartments relate to the units (synapses and cells) in a preferred embodiment. Numeral 1 represents a synapse; numeral 3 represents a cell; numeral 15 represents a connection between synapse and cell; numeral 5 represents a synaptic layer; numeral 7 represents a cell layer; numeral 9 represents a synaptic layer; numeral 11 represents the area where a synapse releases substance into the diffusion compartment; and numeral 13 represents a discrete diffusion compartment. The entire volume is divided into these compartments wherein a substance moves between diffusion compartments according to Fick's law.

FIG. 1 illustrates how the space is divided into discrete diffusion compartments and how these discrete compartments relate to the units (synapses and cells) in the neural network. The units are arranged in rectangular layers which can be placed anywhere within a simulated three-dimensional volume or which can be placed outside of a simulated volume.

Figure 2:
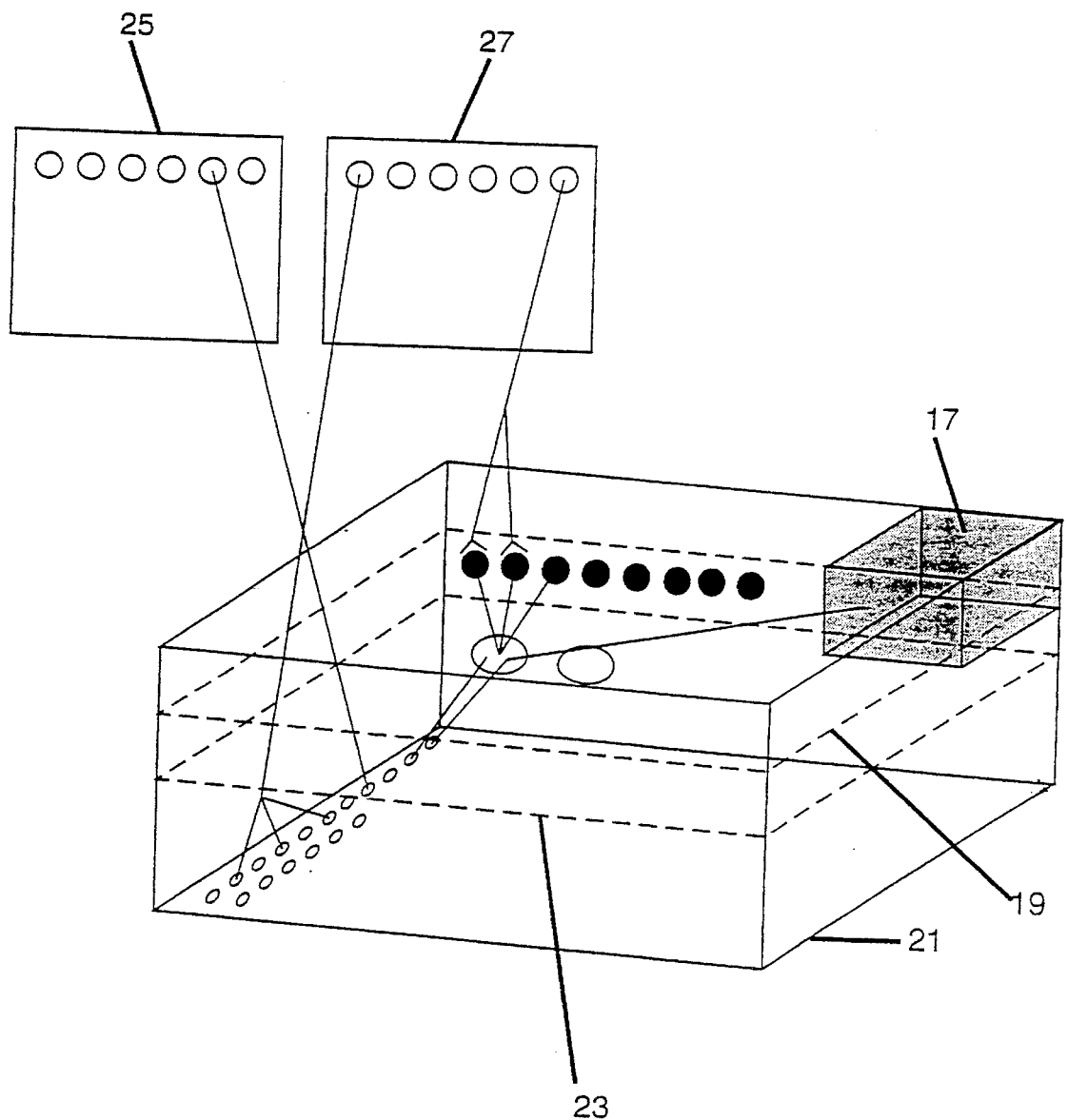
FIG. 2 is a diagram illustrating one method for external introduction of diffusible substances. Numeral 17 represents a region into which a simulated electrode introduces a substance at a constant rate, wherein synapses in the region can be affected; numerals 19 and 21 each represent a synapse layer; numeral 23 represents a cell layer and numerals 25 and 27 each represent a cell layer outside of the simulated volume unaffected by the substances in the volume.

Typically, the units in the simulation are used to represent either synapses or cells. Both the synapses and the cells can produce substances that are released into the surrounding space. The amount of substance released by a synapse may be made to depend on the activation level of that synapse, and the amount of substance released by a cell may be made to depend on the activity level of that entire cell, which is in turn determined by all of its input synapses. Many important parameters that contribute to the overall state of the network can be made contingent upon the local concentration of the released substances. These parameters include: the cell activities (firing rates or probability of firing), the synaptic voltages, the changes in synaptic strengths, and the actual connectivity of the network. Since three dimensional space is explicitly modeled as discrete diffusion compartments, the simulator allows for the external introduction of agents that can move through space according to the diffusive properties of the modeled agent and thus the device can be used to simulate the effects of pharmacological agents that are introduced into a region of neural space possessing realistic neuroanatomy. FIG. 2 illustrates how some units can be placed outside a simulated volume and one method for the introduction of substances into the simulated volume is shown.

Figure 3:
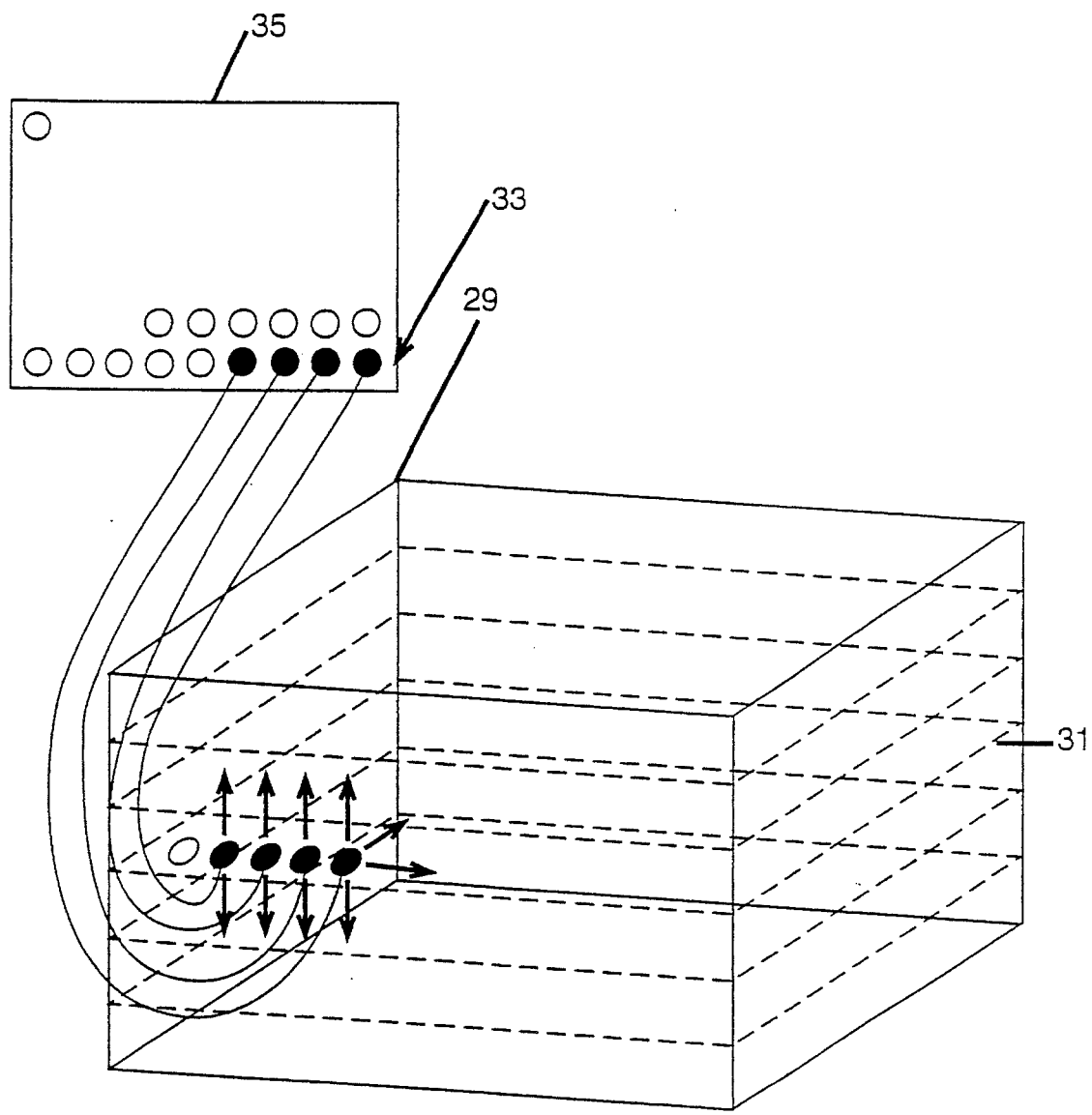
FIG. 3 is a diagram illustrating internal production of diffusible substances. Numeral 29 represents a simulated volume; numeral 31 represents a layer that produces substances; numeral 33 represents a portion of input that is activated. Because of connections, this activation causes production of substance in particular places at particular times. Numeral 35 represents an input array.

The simulator's input allows the user to specify the three dimensional volume and the layers of synapses and cells. The input into the neural network is accomplished by establishing connections from an input array and some layer or layers in the network. The layers can then be interconnected in any arbitrary way that is limited only by the memory capacity of the machine that executes the preferred implementation. The input file allows a user to control the spatial position of each cell or synaptic layer and the production of substances by each layer. The time and place of the external introduction of a substance or substances can also be controlled via the input file. Input into regions of the simulated three dimensional space can be accomplished in a variety of ways. FIG. 3 shows one preferred manner for organizing the internal production of diffusible substances. A layer of units is placed in the simulated space such that it has no connections to or from any other layer of units, but only receives connections from the input array. The connections from the input array act to produce a substance that is released into the surrounding space. The activation of different regions of the input array allow the user to control when and where a substance is introduced into the simulated three dimensional space.

Figure 4:
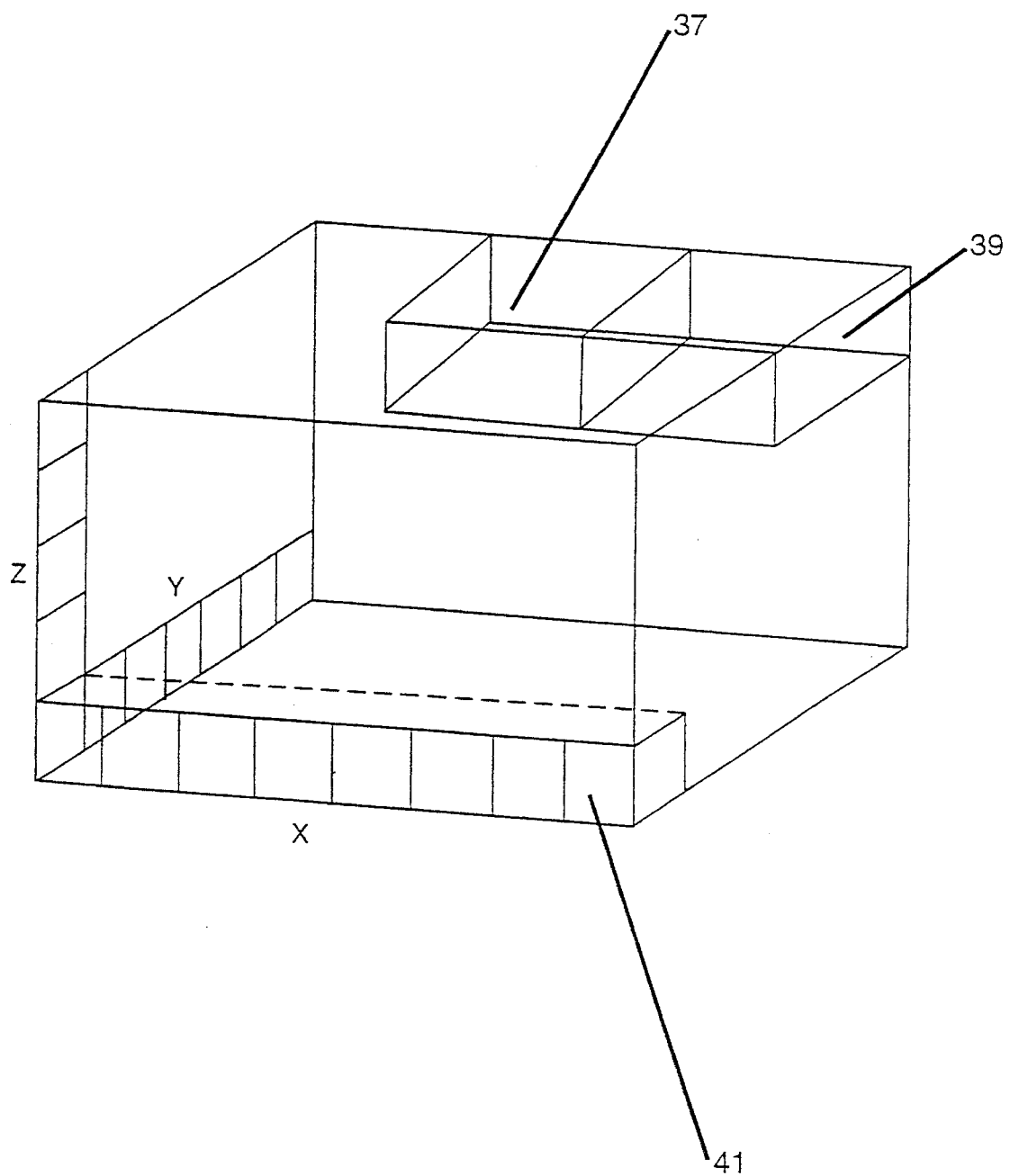
FIG. 4 is a diagram illustrating how the three-dimensional volume is defined. Numeral 37 represents processors that communicate the contents of their brick to all neighboring processors; numeral 39 represents a "brick" handled by each processor, wherein the brick is composed of an integral number of diffusion compartments; numeral 41 represents a user specified number of diffusion compartments along each dimension (X,Y,Z).
Figure 5:
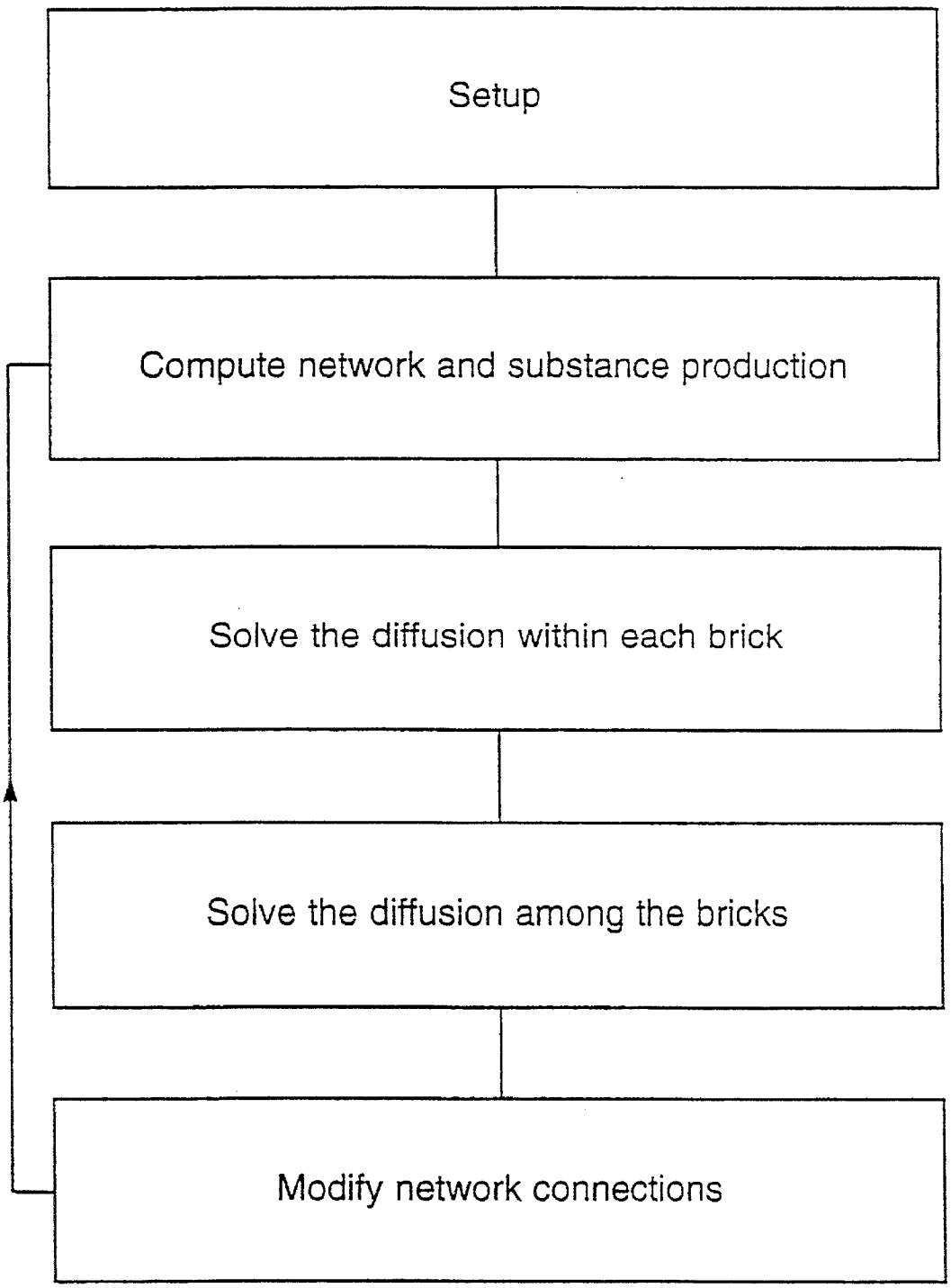

The simulator has been implemented on a multiple-instruction— multiple-data (MIMD) parallel digital computer, but the simulator can also be implemented on other parallel or serial machines or other hardware. FIG. 4 illustrates how the three dimensional volume is defined and simulated and how the state of the neural network can affect regions of the simulated volume. The user specifies a volume by specifying (via the input file) the number of discrete diffusion compartments required along the x, y, and z axes. Since the number of compartments along each dimension can be different, any box-shaped volume can be simulated. On the MIMD computer, the simulated volume is divided into "bricks" composed of one or more discrete diffusion compartments such that each processor or node receives one brick and neighboring bricks are handled by 'neighboring processors' (processors directly connected by communication channels). On each processor, all the computations related to the production and diffusion of substances are handled separately from the computations associated with the state of the neural network. The flow diagram in FIG. 5 shows the scheme for evaluating both the state of the neural network, the state of each diffusion compartment, and the contingencies that exist between these two calculations.

The performance of the neural network may be limited to specific robotic or automaton responses as shown in U.S. Pat. No. 5,136,687. Alternatively, to determine the response of internal components of the neural network corresponding to the effect of substances upon the brain, the output may be a color display that is capable of displaying the state of the neural network, the concentrations of the discrete diffusion compartments, and many aspects of the anatomy of the network.

DETAILED PHYSICAL AND FUNCTIONAL DESCRIPTION

A preferred embodiment of the present invention is a simulation of a volume of neural tissue as shown in FIG. 1. The simulation resides in a digital computer or other processor. An input cell layer sends processes (axons) to various regions of the neuropil, where the axons form synapses with neural processes (dendrites) from an output cell layer. ("Neuropil" describes the region of interaction of axons and dendrites, where there may be few cell bodies.)

In a preferred embodiment, the input cell layer and the output cell layer are considered to be planar. The neuropil is considered to be three-dimensional, with its volume typically divided into 32,768 cubic diffusion compartments, each with an edge corresponding to 0.1 mm, to form a total volume of 3.2×3.2×3.2 mm. In a typical instance, the neuropil contains three synaptic layers, each with 16,384 synapses distributed within a volume corresponding to 3.2× 3.2×0.6 mm. These synapses form between the 4096 axons originating in the input cell layer and 4096 dendrites of cells in the output cell layer. The axonal input to the neuropil enters topographically, but displays randomized variance in the shapes of the terminal arborizations. Each postsynaptic site (on the dendritic arborizations) receives a single connection. Synaptic strengths vary from 0 to 1; the initial values are drawn from a Gaussian distribution with a specified mean and variance. All synapses are assumed to be excitatory, although this is not essential in general.

During a simulation, an alternating series of stimuli are presented to the neuropil by simulating activity in the input cell layer. In each cycle, synaptic strengths and transmembrane potentials are calculated individually for each synapse. Various phenomenological rules for governing changes in synaptic strength can be used. For example: when the presynaptic ending releases an excitatory neurotransmitter (changing the transmembrane potential) and the local concentration of a diffusible substance is above some threshold, T1, the subsequent strength of that synapse is increased; when the presynaptic ending releases a transmitter and the local concentration of a diffusible substance is below some threshold, T2, the subsequent strength of that synapse is decreased; and when the presynaptic ending fails to release neurotransmitter when the concentration of a diffusible substance is above some threshold, T3, the subsequent strength of that synapse is decreased. Typically, T2<T1<T3. Furthermore, a change in the transmembrane potential at a synapse can cause that synapse to produce a diffusible substance; the amount produced is proportional to the amount of voltage change, above another threshold, T4. The amount of depolarization depends on the synaptic strength of that particular synapse and the presynaptic firing rate.

In a preferred embodiment, the diffusible substance is considered to be nitric oxide (NO). The concentration of diffusible substance in each diffusion compartment is calculated in each cycle by summing the amount locally produced, subtracting the amount degraded (calculated from an exponential decay rule with a typical half life being 4 seconds), and accounting for the changes due to diffusion. In the current simulations, diffusion is assumed to occur isotropically according to the known diffusion constant of NO ($2.6\times10^{-5}$ cm$^2$/sec) and to obey Ficks Laws. At the end of each cycle, the dendritic potentials of each cell in the output layer are summed, and those in which the total depolarization exceeds a preset threshold are recorded as firing. The spatial distribution of synaptic voltages, synaptic strengths, concentrations of diffusible substances, and the activity of the output cells are recorded and displayed at each time step.

In a typical simulation, two different spatial patterns of activation in the input cell layer are used alternatively as stimuli. Initially, the distribution of firing patterns in the output layer is scattered and weak, and the distribution of synaptic strengths is rather uniform. After further stimulation, the spatial distribution of synaptic strengths and pattern of output cell firing have organized into patterns that reflect the patterns of activation in the input cell layer. Properties of cells that are not anatomically connected are influenced by the diffusible substance, yielding spatially segregated regions of neuronal activity. Those synapses with activity correlated with that of their spatially proximate neighbors increase their efficacy, while those with uncorrelated activity decrease their efficacy. The invention presents for the first time, quantitative predictions of the effect simulated NO on structures analogous to portions of a brain. By substituting the diffusion coefficients of other substances, it enables the quantitative testing of the effects of such substances without endangering a biological organism.

While there have been shown and described and pointed out the fundamental novel features of the invention as applied to preferred embodiments thereof, it will be understood that various omissions and substitutions and changes in the form and details of the device illustrated and in its operation may be made by those skilled in the art without departing from the spirit of the invention. The invention, therefore, is limited only as indicated by the scope of the claims defining the present invention.

We claim:

1. An apparatus for categorizing objects said apparatus comprising a neural network having a plurality of cells, each cell comprising
memory means for storing a state variable,
said neural network further comprising
a plurality of synaptic junctions, each of said synaptic junctions connecting cells of said network and having
memory means for storing a synaptic strength variable and
computer means to modify said synaptic strength variable in accordance with a heterocellular synaptic modification rule that includes both the passage of time and the values of the state variables of said cell and of those other cells having specific spatial locations with respect to said cell in three dimensional space.

2. The apparatus for categorizing objects of claim 1 wherein said heterocellular synaptic modification rule models a substance that diffuses in three dimensions from cell to cell.

3. The apparatus for categorizing objects of claim 1 wherein said heterocellular synaptic modification rule models an electromagnetic field that propagates in three dimensions from cell to cell.

4. An apparatus for displaying a change of state of a plurality of groups of neurons representing a portion of a brain in response to chemical stimulation comprising a plurality of synaptic connections between pairs of said groups of neurons, each said synaptic connection comprising memory means for storing a synaptic strength variable, computer means to modify said synaptic strength variable in accordance with a heterocellular synaptic modification rule, means for simulating a propagating disturbance in three dimensional space at each synaptic connection and for modifying said synaptic strength variable in accordance with said simulated propagating disturbance in three dimensional space, and means for displaying the state of said groups of neurons in response to said propagating disturbance.

\* \* \* \* \*

UNITED STATES PATENT AND TRADEMARK OFFICE
CERTIFICATE OF CORRECTION

PATENT NO. : 5,485,546
DATED : January 16, 1996
INVENTOR(S) : Rubenstein et al.

It is certified that error appears in the above-indentified patent and that said Letters Patent is hereby corrected as shown below:

On title page, item [75] Gerald M. Edelman; Joseph A. Gally; P. Read Montague; George N. Reeke.

On title page, item [19] should read --Edelman, et al

Signed and Sealed this

Sixteenth Day of April, 1996

*Attest:*

BRUCE LEHMAN

*Attesting Officer*  *Commissioner of Patents and Trademarks*